June 20, 1950  H. M. WOODHAMS ET AL  2,512,453
AIRFOIL CONSTRUCTION
Filed July 19, 1947  3 Sheets-Sheet 1
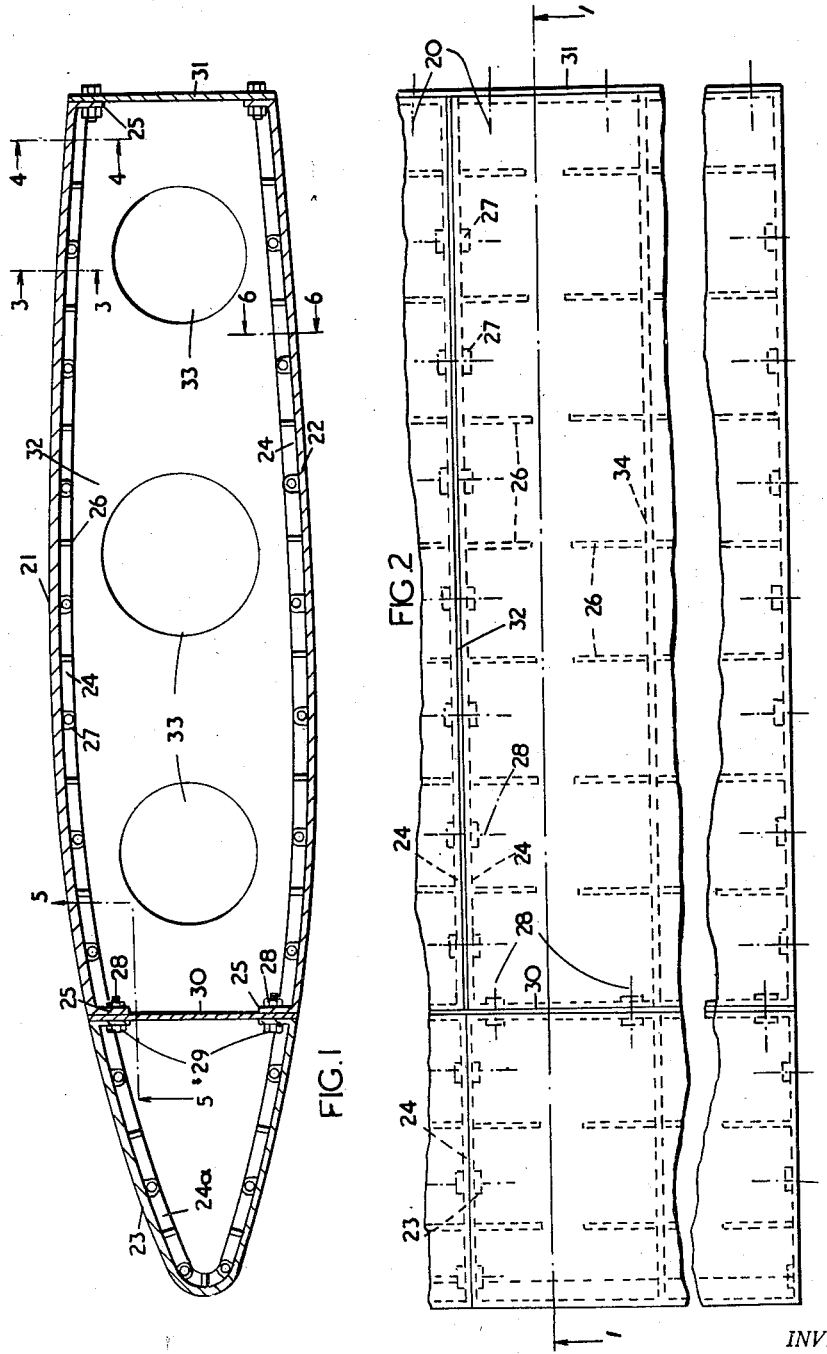
INVENTORS
H. M. WOODHAMS &
BY S. W. D. LOCKWOOD
Mawhinney Mawhinney
Attys.

June 20, 1950 H. M. WOODHAMS ET AL 2,512,453
AIRFOIL CONSTRUCTION
Filed July 19, 1947 3 Sheets-Sheet 2
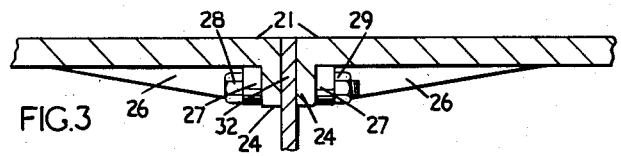
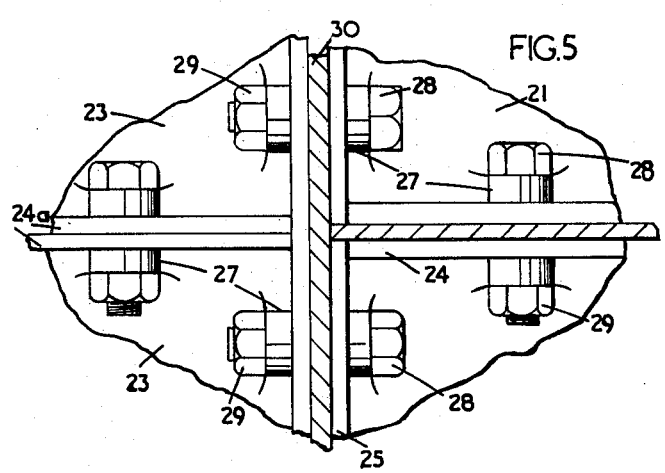
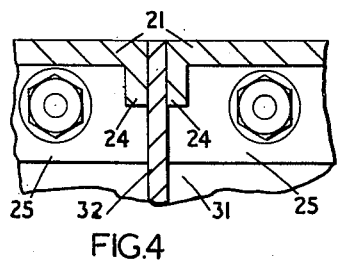
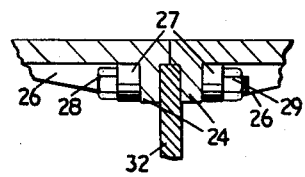
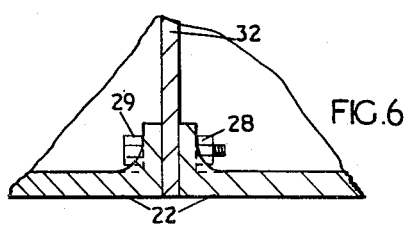
INVENTORS.
H. M. WOODHAMS &
BY S. W. D. LOCKWOOD
Attys.

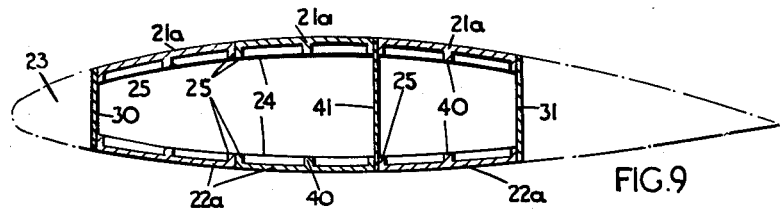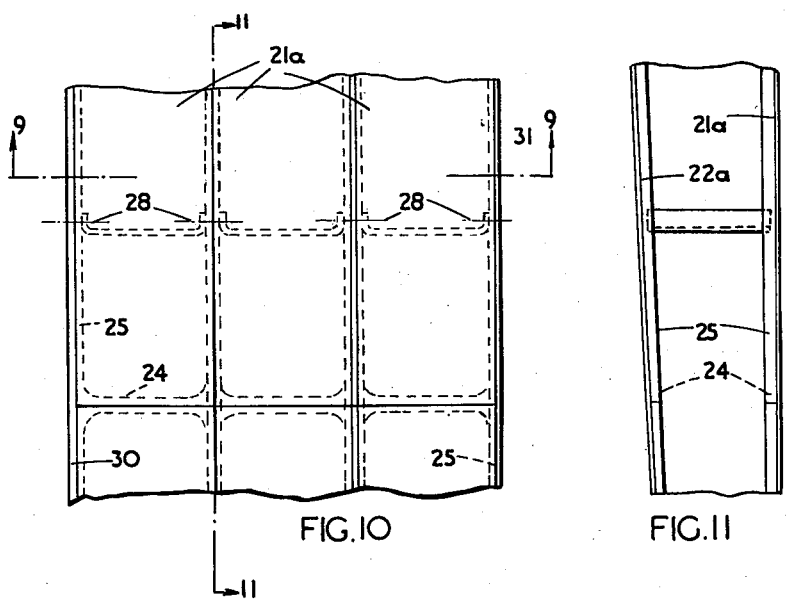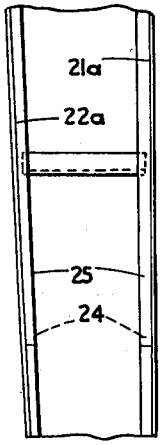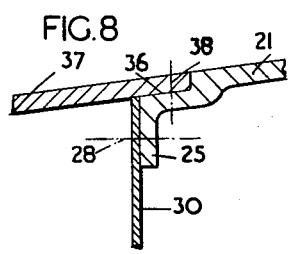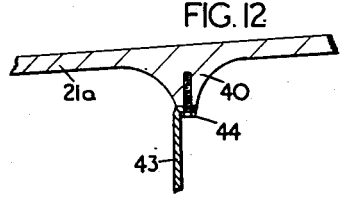

Patented June 20, 1950

2,512,453

UNITED STATES PATENT OFFICE 2,512,453

AIRFOIL CONSTRUCTION

Herbert M. Woodhams and Sidney W. D. Lockwood, Coventry, England, assignors to Sir W. G. Armstrong Whitworth Aircraft Limited, Coventry, Warwickshire, England Application July 19, 1947, Serial No. 762,104
In Great Britain August 1, 1946

2 Claims. (Cl. 244—124)

1

Considerable difficulty has been experienced in manufacturing the built-up structure of a smooth-surfaced aerofoil, particularly of an aircraft wing, owing to the extremely fine limits of accuracy which are required to avoid disturbing the laminar-air-flow characteristic.

It is also a matter of some difficulty to construct an aircraft wing to enable access to the wing interior (for maintenance purposes) to be easily attained owing to the disturbance to the air-flow caused by inaccuracies in the exterior skin due to access doors in the upper and/or lower surface.

The main objects of the invention are to provide an improved aircraft wing and a method whereby the same can be constructed accurately and far more simply and quickly than has hitherto been possible, the method particularly lending itself to repetition production methods.

According to the invention, an aerofoil has the main portion, at least, of its air-swept surface formed of accurately formed panels, of appropriate curvature, having inwardly-projecting marginal flanges rigidly connected together.

Of the accompanying drawings:

Figure 1 is a chord-wise section through one form of aeroplane wing according to the invention, the trailing-edge portion being omitted and the section being on the line I—I of Figure 2;

Figure 2 is a fragmentary plan, partly broken away, corresponding with Figure 1;

Figures 3, 4 and 5, are, respectively, sections, to a larger scale, on the lines 3—3, 4—4, and 5—5 of Figure 1;

Figure 6 is a detail view, to the same larger scale, illustrating a modified form of the marginal flanges;

Figure 7 is a view corresponding to Figure 3 but showing a method, according to the invention, of securing a chord-wise stiffener in position between two adjacent panels without the stiffener breaking through to the air-swept surface;

Figure 8 is a sectional detail view showing how a panel, according to the invention, may be recessed along an edge to receive an attachment plate—for example, of a leading-edge portion of a wing, a trailing-edge portion, or a wing tip portion;

Figure 9 is a chord-wise section through another form of aeroplane wing, according to the invention, with the leading and trailing edge portions indicated only by chain lines, the section being taken on the line 9—9 of Figure 10;

Figure 10 is a fragmentary plan of the main portion of the wing of Figure 9, i. e., excluding the leading-edge and trailing-edge portion, and

2

Figure 11 is a section taken on the line 11—11 of Figure 10; and

Figure 12 is a fragmentary section showing a method of attaching an internal stiffener to a rib of the panel.

Throughout the various figures of the drawings corresponding reference characters are used to denote similar parts as far as possible.

Referring to Figures 1 to 5, the main portion of the wing is built up from a span-wise series of upper and lower panels 21 and 22 which are preferably longer in the span-wise than in the chord-wise direction of the wing. This series of panels is connected to a leading-edge portion 23 and to a trailing portion (not shown). Each of the panels has a chord-wise marginal flange 24 at each end and a span-wise marginal flange 25 at each side, the panels, interiorly of the wing, being somewhat tray-like in appearance. The span-wise flanges 25 are, in this instance, shown as being deeper than the chord-wise flanges 24. The flanges 24 are stayed by triangular gussets 26 (see Figure 3) and the flanges 24 and 25 have bosses 27 which are drilled to receive fixing bolts, rivets, or the like. The drawings show the use of bolts 28 and nuts 29.

In constructing the wing, the leading-edge portion 23 (which may be formed of aligned span-wise sections bolted together through flanges 24a thereof as indicated in Figure 2) is bolted by some of the bolts 28 to the adjacent flanges 25 of the panels 21 and 22 with an intervening spar 30 (which may be formed of full-span length, or in sections which may, or may not, terminate at the chord-wise junctions of the panels 21 and 22).

In a similar way the trailing-edge portion is secured to the panels 21 and 22 with an intervening spar 31.

After the main portion of the wing has been assembled, the whole of the outer surface thereof can be machined, as necessary, to the desired profile, for instance, on a plane-miller fitted with a Keller copying device, or some other suitable means.

The panels, when of light alloy, may be cast, but are preferably formed as bars or strips by extrusion methods, to be greater in thickness than the external height of the flanges 24 and 25. The panels are then machined, in any suitable manner at their inner surfaces so as to form the flanges, gussets and bosses and the like. If, on the other hand, the panels are to be moulded, the flanges, gussets, and bosses can be formed during that process.

We prefer for there to be a chord-wise stiffener 32 between adjacent panels, the bolts 28 which secure the panels also holding the stiffener in position.

The flanges of the panels and of the leading-edge portion 23 and trailing-edge portion may be recessed so that the stiffeners 32 and spars 30 and 31 do not break through to the air-swept surface of the wing, as indicated by Figure 7. The spars and stiffeners may be provided with lightening holes 33 which also serve to facilitate assembling and dismantling of the wing.

If desired the inner edges of the flanges 24 and 25 may sweep into the inner surfaces of the panels (so that the roots of the flanges are thicker than their free edges, as shown in Figure 6) and thus produce a more rigid flange. With this construction, however, instead of providing the bosses 27 suitable recesses are formed in the flanges to provide parallel surfaces for coaction with the heads of the bolts 28 and the captive nuts 29.

In some instances, particularly when the panels are relatively long in the span-wise direction, they may be provided with intermediate chord-wise ridges 34 (see Figure 2) and these ridges may be stayed laterally by gussets 26.

Figure 8 shows a modification in which the external surface of a panel (one of the upper panels 21 is chosen for purposes of illustration) is provided with a machined recess 36 along its edge to receive a shaped plate 37 of some part to be attached to the panel. The plate 37 in Figure 8 is assumed to be part of the leading-edge portion; but obviously the same method of attachment may be applied in respect of the trailing-edge portion, or of the wing tip section. In this construction the front spar 30 is shown as fitting beneath the plate 37, which is secured in position by means of flush-fitting bolts, as indicated by the chain line 38. Obviously the lower panel 22 will be provided with a similar recess to receive a corresponding attachment plate.

Access doors may be provided in the air-swept surface of a panel 21 or 22 in order to facilitate assembly or for other purposes, these doors preferably consisting of flush-fitting plates let into recesses round openings in the panel and secured by counter-sunk screws or the like, in the manner described above in connection with one edge of the panel in Figure 8.

Referring now to Figures 9, 10 and 11, these show a modification in which the main portion of the wing, excluding the leading and trailing edge portions, is formed of three series of upper span-wise panels 21a and three series of lower span-wise panels 22a, each individual panel being of any convenient span-wise length and all having marginal flanges as previously described, those extending chord-wise being marked 24 and those extending span-wise being marked 25. In addition, in this construction span-wise ribs 40 are provided intermediate the span-wise flanges 25. If desired a span-wise stiffener may be mounted between either adjacent series of the panels. One such stiffener 41 is shown in Figure 9 as being secured between the intermediate series of panels 21a and 22a and the trailing series of panels 21a and 22a. Obviously this stiffener, if preferred, need not break through to the wind-swept surface but may be secured in the manner disclosed by Figure 7.

If desired a span-wise stiffener may be associated with one or more of the ribs 40, or with the chord-wise rib 34 (Figure 2), and Figure 12 shows one such arrangement in which the stiffener 43 is flanged along its upper edge in order to be secured against the inner face of the rib 40 by means of screws 44.

It will be seen that by the invention a very rigid wing can be constructed, the internal flanges and gussets, together with the ridges, when provided, the spars and stiffeners providing ample resistance to bending and twisting loads.

What we claim as our invention and desire to secure by Letters Patent of the United States is:

1. An aerofoil of which at least the main part of the air-swept surface comprises at least one span-wise series of aligned, accurately-formed, four-sided panels, of appropriate curvature, having inwardly-projecting marginal flanges of which those at alternate sides are chord-wise of the aerofoil and those at the intermediate sides are span-wise, at least one interior chord-wise ridge to each panel intermediate its chord-wise flanges, integral gussets connecting the interior face of each panel to the adjacent surfaces of its chord-wise flanges, integral gussets connecting the interior face of each panel to the adjacent sides of its chord-wise ridge, and means connecting adjacent panels together by their respective chord-wise flanges.

2. An aerofoil of which at least the main part of the air-swept surface comprises at least one span-wise series of aligned, accurately formed, four-sided panels, of appropriate curvature, having inwardly projecting marginal flanges, means connecting adjacent panels together by their respective chord-wise flanges, a spar at one side of said series, said inwardly projecting marginal flanges being removed from the end of said panel by a distance one-half the thickness of said spar to accommodate said spar so that the same does not break through to the air-swept surface, and means connecting the adjacent span-wise flanges of said panels to said spar.

HERBERT M. WOODHAMS.
SIDNEY W. D. LOCKWOOD.

REFERENCES CITED

The following references are of record in the file of this patent:

UNITED STATES PATENTS

| Number | Name | Date |
|---|---|---|
| 1,613,602 | Birmingham | Jan. 11, 1927 |
| 1,753,823 | Dornier | Apr. 8, 1930 |
| 1,818,971 | Crichton | Aug. 18, 1931 |
| 1,866,534 | Janin | July 12, 1932 |
| 2,121,670 | Saives | June 21, 1938 |
| 2,225,779 | Hart-Still | Dec. 24, 1940 |
| 2,230,393 | Thomson | Feb. 4, 1941 |
| 2,256,234 | Best | Sept. 16, 1941 |